United States Patent
Morgan

(10) Patent No.: US 6,279,317 B1
(45) Date of Patent: Aug. 28, 2001

(54) HYDROSTATIC DRIVE WITH REGENERATION CIRCUIT

(76) Inventor: George H. Morgan, 401 Tyler Ave., Evansville, IN (US) 47715-3243

( * ) Notice: Subject to any disclaimer, the term of this patent is extended or adjusted under 35 U.S.C. 154(b) by 0 days.

(21) Appl. No.: 09/572,769

(22) Filed: May 17, 2000

Related U.S. Application Data

(60) Provisional application No. 60/137,844, filed on Jun. 7, 1999.

(51) Int. Cl.[7] .............................. F16D 31/02; F16D 39/00
(52) U.S. Cl. ................... 60/413; 60/454; 60/464; 60/488
(58) Field of Search ........................... 60/413, 414, 419, 60/454, 464, 487, 488, 489

(56) References Cited

U.S. PATENT DOCUMENTS

| | | |
|---|---|---|
| 4,002,028 | 1/1977 | Budzich . |
| 4,503,928 | 3/1985 | Mallen-Herrero et al. . |
| 4,649,705 | 3/1987 | Williamson . |
| 5,511,368 * | 4/1996 | Kocher ................................. 56/15.2 |
| 5,794,438 | 8/1998 | Lisniansky . |
| 6,145,287 * | 11/2000 | Rosskopf ............................. 56/10.9 |

OTHER PUBLICATIONS

American Society of Agricultural Engineers, paper #911596 Gerotor Rotary Flow Divider by George H. Morgan, P.E.

* cited by examiner

*Primary Examiner*—Edward K. Look
*Assistant Examiner*—Michael Leslie
(74) *Attorney, Agent, or Firm*—Theresa F. Camoriano; Mark A. Manley; Gary K. Price

(57) ABSTRACT

The hydrostatic drive with regeneration circuit comprises a geroter flow divider which operates in conjunction with a two position three way valve and a check valve to provide regeneration flow for the hydrostatic drive when the valve is energized.

11 Claims, 4 Drawing Sheets

HYDROSTATIC DRIVE WITH REGENERATION CIRCUIT

CROSS REFERENCES TO RELATED APPLICATIONS

Provisional Application for Patent No. 60/137,844 of Jun. 7, 1999, with the same title, "Hydrostatic Drive With Regeneration Ciruit" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to improving the performance of a hydrostatic drive, especially a hydrostatic drive for a vehicle, by means of a regeneration circuit.

2. Background Information

Hemostatic drives are popular in applications where it is desirable to have good speed control under varying loads. They are also popular in hazardous, dirty, and nasty environments, such as coal mines, quarries, food processing plants, and on construction sites. Much effort has been expended in trying to increase the efficiency and performance ranges of hydrostatic drives. Hydrostatic drives are typically called, in the trade, closed loop systems, and comprise a fixed or variable displacement pump supplied with fluid by means of a charge pump.

Existing ways of obtaining a broader range of speed and torque in a hydrostatic drive with a given pump, motors, and engine combination comprise:

a) using a mechanical transmission with a variety of gearing arrangements in conjunction with one or more hydraulic motors, and b) valving to switch the hydraulic motors from a parallel circuit to a series circuit, and back again, as required.

Regeneration circuits are common to the trade on industrial equipment such as hydraulic presses. Regeneration circuits using rotary dividers are in the public domain for industrial equipment such as hydraulic presses. A publication illustrating gerotor rotary flow dividers in regeneration circuits is the American Society of Agricultural Engineers Paper No. 911596 "Gerotor Rotary Flow Divider" by George Morgan, P. E., Sales Manager, White Hydraulics, Inc. presented at the 1991 International Winter Meeting sponsored by the American Society of Agricultural Engineers at the Hyatt Regency Chicago, Chicago, Ill., December, 1991 which is hereby incorporated by reference. The American Society of Agricultural Engineers is located at 2950 Niles Road, St. Joseph, Mich., 49085-9659, USA, Ph. (616) 429-0300, Fax: (616) 429-3852.

Hydra-Pneu Consulting, Inc., 726 Outer Gray Drive, Newburgh, Ind. 47630-1517, Ph. (812) 853-3234, conducted a course in "Advanced Fluid Power" in 1991, where the instructor, Bud Trinkel, discussed the use of a rotary flow divider in an open loop press circuit. One of his previous students had developed it, and brought it to his class. Applicant then introduced it to his employer at the time, White Hydraulics, Hopkinsville, Ky. The engineers doubted it would work. It did.

The state of the art uses flow dividers in regeneration circuits for open loop, fixed displacement circuits. Neither regeneration circuits, nor regeneration circuits with rotary flow dividers, nor regeneration circuits with gerotor rotary flow dividers have ever been used with closed loop hydrostatic drives, especially vehicle closed loop hydrostatic drives.

With existing state-of-the-art hydrostatic drives with bi-directional pumps, approaches to proper filtration and cooling are limited. High pressure filtration arrangements are expensive, so typically are not used on mobile equipment. Similarly, for coolers to withstand the high pressures of the hydrostatic closed loop system flows, the designs would be heavy and expensive. Consequently, choices for filtration and cooling, practically, are limited to case drain flow or inlet charge pump flow, or hot oil shuttle arrangements where a small amount of flow is cooled and filtered at a time. This means that the bulk of the flow is not properly filtered or cooled, and this results in componentry wear which reduces componentry life.

As will be seen from the subsequent description, the preferred embodiments of the present invention broadens the performance range of a closed loop hydrostatic drive in a novel manner and overcomes exisiting limitations of closed loop hydrostatic drives.

SUMMARY OF THE INVENTION

The present invention is an improvement to a closed loop hydrostatic drive which broadens the performance range of said hydrostatic drive with a given prime mover, hydraulic pump, and hydraulic motor combination. Said improvement comprises a rotary flow divider in conjunction with appropriate valving as required to isolate said flow divider from the closed loop hydrostatic drive. In the preferred embodiment of the present invention, a three way, two position, solenoid operated, spring return valve receives exhaust hydraulic flow from at least one hydraulic motor. In normal, or low speed operation, the exhaust flow is the low pressure supply to the hydrostatic drive pump. For the high speed, or regeneration, cycle, the solenoid valve is actuated, and the exhaust hydraulic flow from the at least one hydraulic motor outlet is diverted to a rotary flow divider. In the preferred embodiment of the present invention, for a 20 gallon per minute variable displacement pump in a closed loop hydrostatic drive, it would be a four section White ROLLERSTATOR (Reg. U.S. Trademark) gerotor flow divider. Fluid flow from half of the rotary flow divider sections is returned to a low pressure section of the closed loop hydrostatic drive for return to the pump, while the fluid flow from the other half of the rotary flow divider is routed to a high pressure section of the closed loop hydrostatic drive between the pump and the at least one hydraulic motor. The effect of this arrangement is, for a rotary flow divider with sections of equal fluid displacement per revolution, that the fluid flow into the at least one hydrualic motor becomes approximately double the output fluid flow of the hydraulic pump. The preferred embodiment of the present invention further comprises a filter and an oil cooler and a one-way check valve through which the fluid flow from the half of the rotary flow divider sections is returned to the low pressure section of the closed loop hydrostatic drive is routed after said fluid flow leaves the rotary flow divider and prior to entering into the low pressure side of the closed loop hydrostatic drive. The purpose of the one-way check valve is to prevent reverse fluid flow back through the oil cooler, the filter, and the rotary flow divider. When regeneration is to be used only in one direction, such as forward, an appropriate interlock can be used so the solenoid operated valve is not actuated. Then, when the hydrostatic drive pump is reversed, and what was the low pressure side of the closed loop becomes the high pressure side, said interlock in conjunction with the solenoid operated valve in the at rest position in conjunction with the one-way check valve protects the oil cooler, the filter, and the rotary flow divider from reverse fluid flow.

A low pressure relief valve, normally incorporated in a charge pump supplying fluid to the low pressure side of the hydrostatic drive, precludes excessive pressure building up in said low pressure side of the hydrostatic drive from fluid flow from either of the rotary flow divider or the charge pump.

DESCRIPTION OF THE PREFERRED EMBODIMENTS

Figure 1:
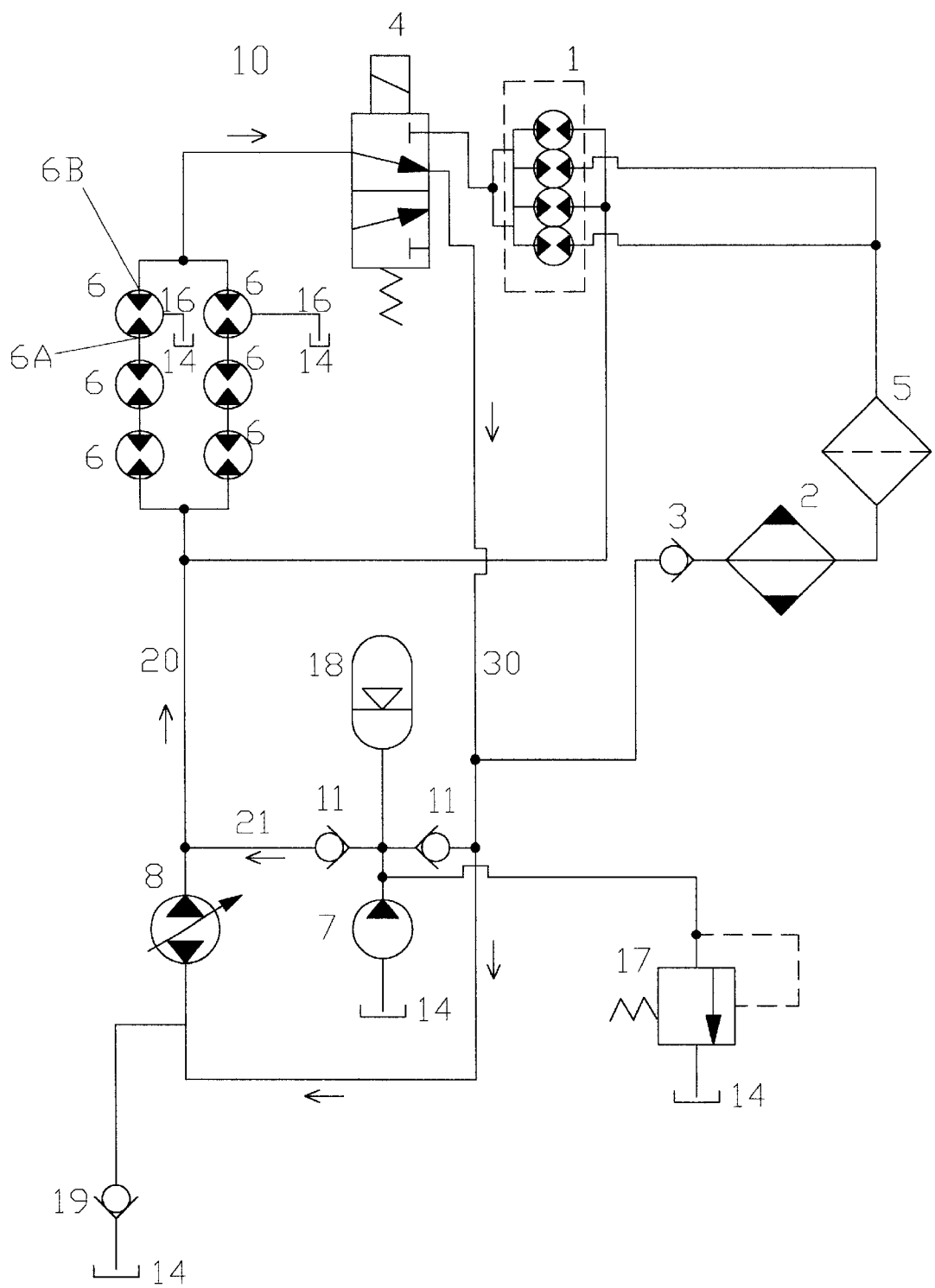
FIG. 1 illustrates the preferred embodiment of the present invention prior to actuation installed in a closed loop hydrostatic drive system.

FIG. 1 illustrates the preferred embodiment of the present invention, a hydrostatic drive with regeneration circuit 10 in a non-regeneration mode comprising a rotary flow divider 1.

Figure 3:
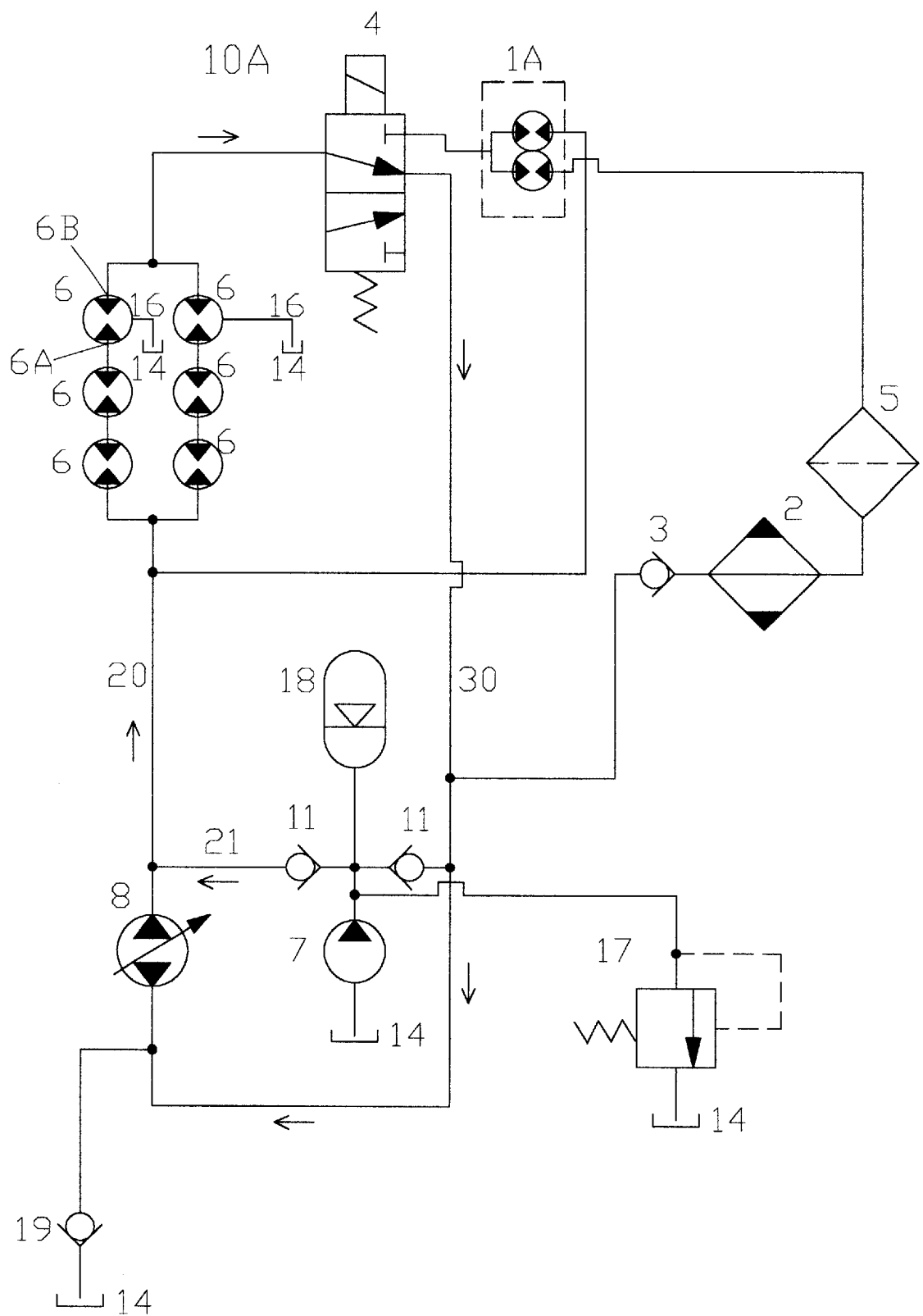
FIG. 3 illustrates an alternate embodiment of the present invention prior to actuation installed in a closed loop hydrostatic drive system.

FIG. 3 illustrates an alternate embodiment of the present invention, a hydrostatic drive with regeneration circuit 10A in a non-regeneration mode comprising an alternate rotary flow divider 1A.

FIGS. 1 and 3 illustrate said circuits 10 and 10A which differ only in that said circuit 10 uses said rotary flow divider 1, while said circuit 10A uses said alternate rotary flow divider 1A.

As shown in FIGS. 1, 2, 3, and 4, said circuits 10 and 10A each further comprise a first pump 8 with a charge pump 7 and check valves 11, at least one hydraulic motor 6, said at least one hydraulic motor 6 further comprising an inlet 6a and an outlet 6b, a valve means 4, a rotary flow divider 1 or 1A, a filter 5, an oil cooler 2, a reverse flow check valve 3, a reservoir 14, an accumulator 18, and an anti-cavitation valve 19. The accumulator 18 and the anti-cavitation valve 19 are optional features, depending on the circuit application, which will be discussed further in this specification.

The check valves 11 are contained in a supply line 21 between said charge pump 7 and said first pump 9.

In the preferred embodiment of the present invention, the valve means 4 is a solenoid operated spring return two position three way valve.

The valve means 4 is in fluid communication with the outlet 6b of the at least one hydraulic motor 6.

In vehicle drive systems, the first pump 8 would typically be a variable displacement, bi-directional, axial piston pump. In industrial drive systems, the first pump 8 could be a fixed displacement pump, and is not necessarily an axial piston pump, nor does it have to be bi-directional. When the first pump 8 is not bi-directional, the check valve 3 is not required in either of the circuits 10 or 10A.

The charge pump 7 comprises a relief valve 17 which is set at a relatively low pressure, typically in the range of 100 to 350 psi on most hydrostatic drive systems, as compared to the pressure supplied by said pump 8. The charge pump 7 charges said pump 8, which is typically a high pressure pump, supplying make up fluid as required to offset system fluid leakage. The check valves 11 prevent highly pressurized fluid from said pump 8 interfering with flow at a lower pressure from the charge pump 7, yet said check valves 11 permit the charge pump 7 to supply low pressure fluid to said pump 8. In FIGS. 1 and 3, two of the motors 6 are shown with case drains 16 to reservoirs 14. Typically there is only one reservoir 14, but in fluid power schematics it is a common practice to show multiple reservoirs to simplify a schematic.

In the non-regeneration mode illustrated in each of FIG. 1 and FIG. 3, the valve means 4 is in the non-energized state so it, in conjunction with the check valve 3, isolates said flow dividers 1 and 1A from said pump 8 flow in the circuits 10 and 10A. While some leakage is expected internally within said rotary flow dividers 1 and 1A, this is not seen as a problem with flow dividers manufactured as the White ROLLER STATOR™ geroter flow dividers which are manufactured by White Hydraulics, Inc. of Hopkinsville, Ky., a major supplier of geroter hydraulic motors.

In a closed loop hydrostatic drive with said pump 8 and a driven load, such as at least one motor 6, the portion 20 (Ref. FIGS. 1–4) of the loop between said pump 8 and the at least one hydraulic motor 6 is called the higher pressure side or line while the portion 30 (Ref. FIGS. 1–4) of the loop between the exhaust side of the driven load and the inlet of the pump 8 is called the lower pressure side or line. With reversible pumps, when said pumps are reversed, what was the higher pressure side or line becomes the lower pressure side or line, and vice versa, and the direction of flow is reversed, which reverses the direction of rotation of a driven load. In circuits 10 and 10A, when said pump 8 is a bi-directional pump, the check valve 3 is required, to prevent backflow of fluid into said flow dividers 1 and 1A.

Arrows are used to illustrate flow in a direction selected arbitrarily as the forward direction.

Figure 2:
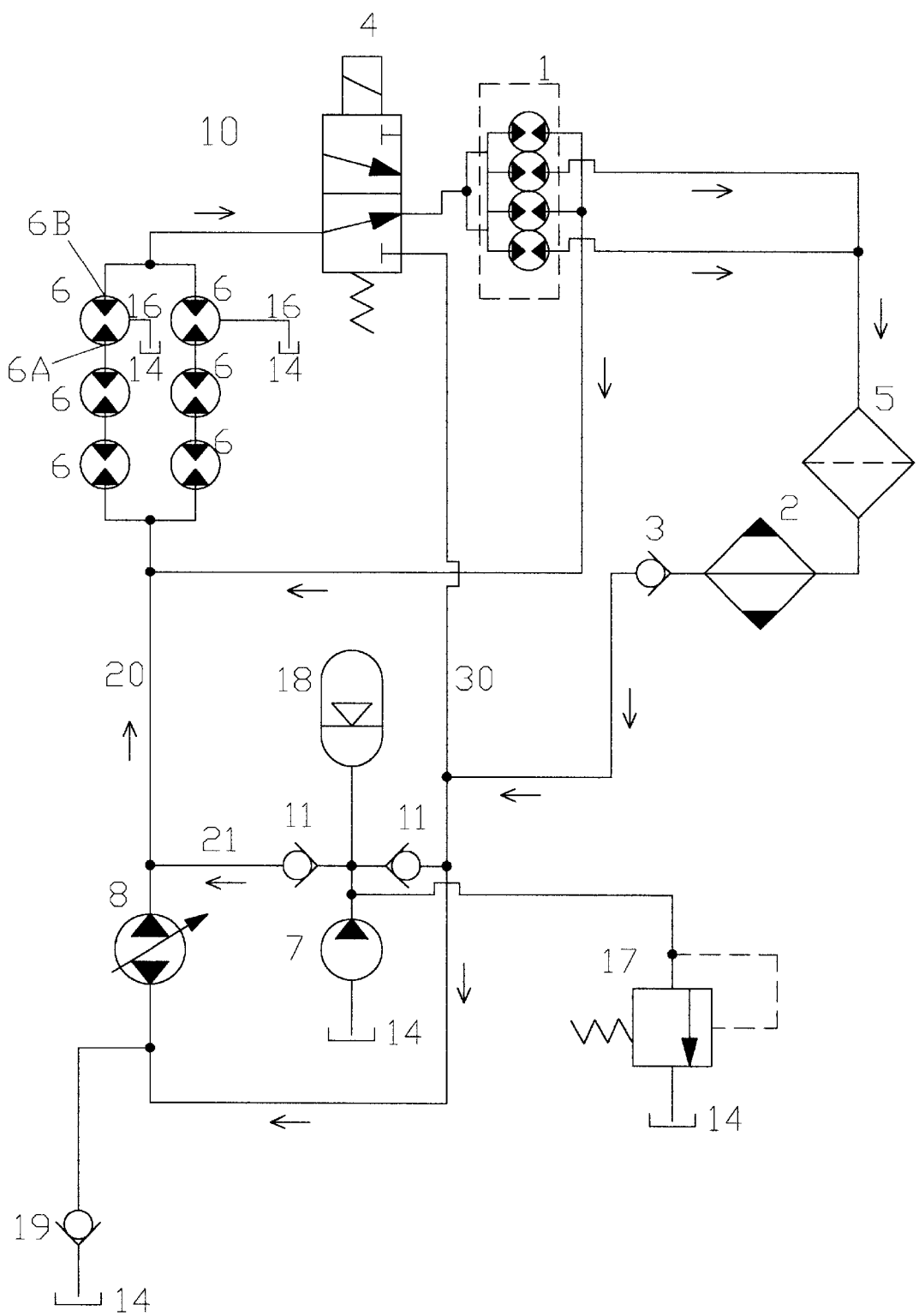
FIG. 2 illustrates the operation of the preferred embodiment of the present invention when said embodiment is actuated.
Figure 4:
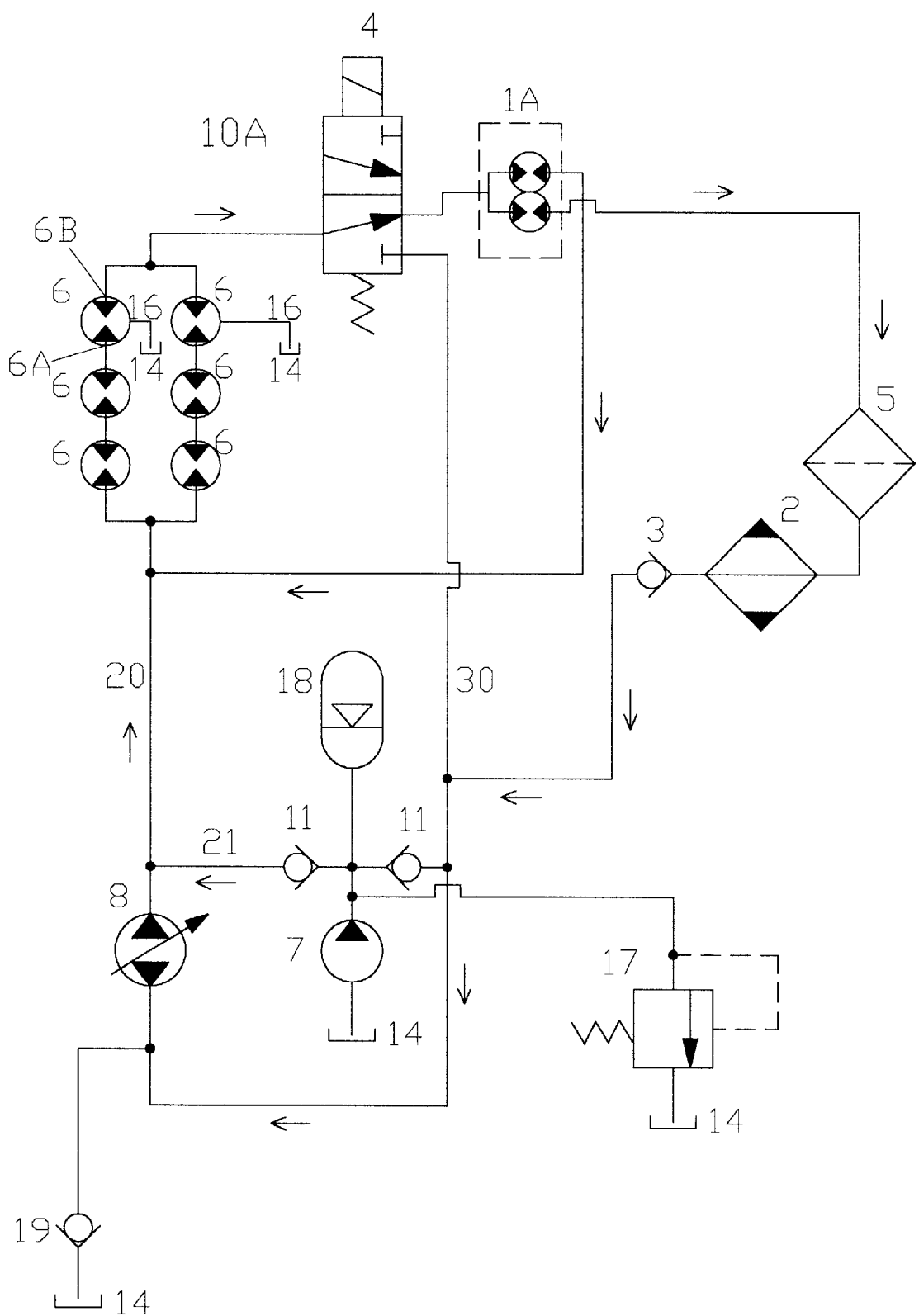
FIG. 4 illustrates the operation of the embodiment of FIG. 3 when said embodiment is actuated.

In the regeneration mode, illustrated in each of FIGS. 2 and 4, the valve means 4 is energized, so flow from the at least one hydraulic motor 6 is routed through said valve 4 into said rotary flow divider 1 in the case of FIG. 2 or 1A in the case of FIG. 4. Flow from half of the sections of said rotary flow dividers, 1 and 1A, is routed through the filter 5, the oil cooler 2, and the check valve 3 into the portion 30 connected to said pump 8, said portion 30 being the lower pressure side or line of each of the closed loop hydrostatic drive circuits 10 and 10A. Flow from the balance of the sections of said rotary flow dividers 1 and 1A is routed to the portion 20 which is the higher pressure side or line of said closed loop hydrostatic drive with regeneration circuits 10 and 10A, i.e. between the pump 8 and the driven load of at least one hydraulic motor 6 in each of said circuits 10 and 10A.

Rotary flow dividers have a characteristic referred to as "intensification". If there is resistance to flow out of one section of a rotary flow divider, pressure of flow from that section can be intensified to a level higher than the pressure of the fluid being supplied to that flow divider by the force applied by inlet pressure on another section of that flow divider if flow from that other section is encountering a much lower pressure.

In FIGS. 2 and 4, a portion of the flow from each of said rotary flow dividers 1 and 1A will be at the total pressure of the portion 30 which is the lower pressure side or line of the closed loop hydrostatic drive circuit, i.e. the charge pump 7 pressure plus line pressure losses plus resistances to flow through the filter 5, the cooler 2, and the one-way check valve 3. The other portion, or balance of the flow from each of said rotary flow dividers 1 and 1A is connected to the portion 20 which is the higher pressure side of each of the closed loop hydrostatic drive circuits 10 and 10A, i.e. the section between said pump 8 and the at least one hydraulic motor 6. The arrows shown in FIGS. 2 and 4 refer to the direction of flow in the forward direction, which is the direction in which regeneration is useful, in the preferred embodiment of the present invention.

As the at least one hydraulic motor 6 is in series with said flow dividers 1 and 1A, in the regeneration mode, pressure will build up on each of said rotary flow dividers 1 and 1A until the flow directed to the portion 20, which is the higher pressure side of each of the hydrostatic drive with regeneration circuits 10 and 10A, reaches sufficient pressure to join in said pump 8 flow into the at least one hydraulic motor 6. Each of the circuits 10 and 10A stabilize when approximately one half of the pressure by said pump 8 drops across the at least one hydraulic motor 6 while the other half of the pressure drops across the sections of said flow dividers 1 and 1A which are each connected to their respective portion 20, which is the lower pressure side of their respective closed loop hydrostatic drive with regeneration circuits 10 and 10A. The action of pressure drop of flow across sections of said flow dividers 1 and 1A connected to said portions 30 causes an intensification of pressure of flow from said flow dividers 1 and 1A connected to the portion 20, or higher pressure side of the closed loop hydrostatic drive with regeneration circuits 10 and 10A, boosting that inlet pressure of fluid to said flow dividers 1 and 1A, which was approximately half of the pressure of the fluid at said pump 8 outlet, up to the pressure required to overcome line losses and flow into the portion 20, which is said pump 8's outlet line. The end result is that for a 20 gallon per minute pump 8 output flow, after said valve means 4 is shifted as shown in FIGS. 2 and 4, 40 gallons are going into the at least one motor 6. If the pressure drop across the at least one hydraulic motor 6 is 2,000 psi, then the resistance to flow at the pump 8 is approximately 4,000 psi.

When sections of said rotary flow divider 1 or 1A are of equal displacement, fluid flow, in the regeneration mode is theoretically doubled, with half the pressure into said at least one motor 6 available for work, theoretically. Practically, in accordance with the Second Law of Thermodynamics, which essentially says "The house takes its cut", there are some losses due to internal leakages & pressure drops through various elements of said hydrostatic drive with regeneration circuit. Energy is not being created or destroyed, by said flow dividers 1 and 1A, merely changed in form.

Variations in the amount of regenerated flow are achievable by varying ratios of sections of said flow dividers 1 and 1A. Varying the amount of regenerated flow, by varying ratios of sections of said flow dividers 1 and 1A, naturally affects how much pressure into said at least one hydraulic motor 6 is available. With less regeneration, by virtue of smaller geroter sections feeding fluid into the line between said pump 8 and said at least one hydraulic motor 6, more pressure drop is available for work across said at least one hydraulic motor 6, as less pressure is required by said flow dividers 1 and 1A on the larger sections for intensifying pressure across the smaller sections of said flow dividers 1 and 1A. Conversely, having larger sections of said flow dividers 1 or 1A feeding fluid into the line between said pump 8 and said at least one hydraulic motor 6, results in less pressure drop available for work across said at least one motor 6.

FIGS. 2 and 4 illustrate the regenerative mode in one direction, which is called the forward direction for purposes of discussion. For reverse direction, the valve means 4 would be deenergized, which, in conjunction with the one-way check valve 3 would isolate the flow divider 1 or 1A from the circuit 10 or 10A oil flow. For a reverse direction, in the regeneration mode, a similar circuit section could be added by anyone skilled in the art without excess experimentation with the information in this specification.

Where it is desirable to have the regeneration only in a single direction, at least one electrical interlock can be used as a safety tied in with an actuating lever or foot pedal so that the valve means 4 cannot be energized when said pump 8 flow is reversed. This can be done without excessive experimentation by anyone skilled in the art.

Usually the charge pump 7 is attached to said pump 8, with the check valves 11 and the relief valve 17 packaged with the assembly of the charge pump 7 and said pump 8. Fluid connection lines would be internal passages as opposed to external lines as illustrated in FIGS. 1–4.

Case drains from said pumps 8 and 7, minor nuances, though important, are not shown, for the sake of clarity, to avoid cluttering up the circuit diagrams and making them more difficult to follow.

A specific example of a useful application for the preferred embodiment of the present invention is a light utility vehicle with each wheel hydraulicly driven where it is desirable to carry relatively heavy loads at one speed range, yet have a higher speed range when not hauling said loads.

An additional benefit of the preferred embodiment of the present invention is that the oil cooler 2 provides a cooling advantage in the hydrostatic drive with regeneration circuits 10 and 10A, because when the valve means 4 is energized, half of the flow is going through the cooler 2 at low pressure.

Another benefit of the preferred embodiment of the present invention is that the filter 5 receives relatively low pressure flow, so considerable flow can be filtered when the valve means 4 is energized.

At the time said circuits 10 and 10A are put into the regenerative mode, i.e. the valve means 4 is shifted so the oil flow is directed through said flow dividers 1 and 1A, additional oil is required in the portion 30 of said circuits to preclude pump 8 cavitation. For slowly accelerating loads, such as might be encountered in some industrial applications, with proper charge pump 7 sizing, the additional oil required is available from the charge pump 7. For faster accelerating loads, the accumulator 18 can serve as a source of the additional oil. Also, the anti-cavitation valve 19 can served as a source of additional oil.

Although the description above contains many specificities, these should not be construed as limiting the scope of the invention but as merely providing illustrations of some of the presently preferred embodiments of this invention.

For example, said rotary flow divider 1, in the preferred embodiment is a four section geroter rotary flow divider, such as a model number FD18181818 made by White Hydraulics of Hopkinsville, Ky. This design is preferred over a two section geroter rotary flow divider FD00181800 because at 40 gallons per minute of fluid flow, a pressure drop of 140 psi would be typical for the four section version as opposed to a 300/350 psi pressure drop for the two section flow divider. Each 100 psi pressure drop at 40 gallons per minute translates into approximately a 3.3 horsepower input which translates into heat would have to be removed from a closed loop. For vehicle drives, both the extra horsepower requirement plus the extra heat disposal is undesirable.

In the White Hydraulics ROLLERSTATOR™ geroter flow dividers model numbering system, the digits 18 signify that the geroter elements used in said flow divider FD00181800 each displace 18 cubic inches of fluid per revolution.

While gear type rotary flow dividers of high capacity with low pressure drop exist, they tend to be considerably more expensive and less efficient across the lower speed ranges than geroter flow dividers such as are manufactured by White Hydraulics.

Also, said rotary flow divider 1A, as a preferred alternate embodiment, would be a two section geroter flow divider such as can be made by White Hydraulics using motor components in production, that have higher flow capacities than the motor components now used in the aforementioned FD models. A two section flow divider with a lower pressure drop is obviously more desirable from a customer standpoint. With demand, the various gerotor motor manufacturers could supply such hardware.

Also, the valve means 4 is shown as a solenoid operated valve. Similar valves with other types of actuation, such as pneumatic, hydraulic, or manual would also serve the same purpose.

Also, typically, said pump 8 has an internal high pressure relief valve, which was not shown in the figures to keep the schematic simple. As an alternative, a high pressure relief valve can be added to protect the pump and the motors from high pressures and such is well known in the art. In some cases, such as mobile circuits, wheel skid is relied on to protect the circuit as opposed to high pressure relief valves. Again, these were not shown in order to keep the circuits 10 and 10A easy to comprehend.

Also, there are many ways to eliminate heat from a closed loop hydrostatic drive circuit and to filter fluid, so the placement of the oil cooler 2 and the filter 5 shown in the drawings should be considered as a way, not the only way. They were shown as a unique approach.

Also, the term fluid is intended to cover any fluid suitable for serving its intended purpose in the preferred embodiment of the invention described. There are many different types of fluids currently used or being developed for hydraulic drives, including hydraulic oils, engine oils, synthetic oils, vegetable base oils, even water with and without additives.

It will be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A closed loop hydrostatic drive with regeneration circuit comprising:
   a) a first pump which draws fluid from a lower pressure line and supplies a higher pressure line,
   b) a charge pump with,
   c) at least one one-way check valve in a supply line between said charge pump and said first pump,
   d) at least one hydraulic motor having an inlet and an outlet,
   e) a valve means in fluid communication with the outlet of said at least one hydraulic motor and
   d) a rotary flow divider
   wherein said first pump supplies fluid to the at least one hydraulic motor,
   wherein exhaust flow from the at least one hydraulic motor can be diverted to the rotary flow divider by said valve means,
   wherein a portion of the flow from the rotary flow divider is returned at low pressure to said lower pressure line of said closed loop hydrostatic drive, and
   wherein a portion of the flow through the rotary flow divider is supplied to said higher pressure line resulting in a volume of flow into said at least one hydraulic motor that is greater than the volume supplied by said first pump.

2. The closed loop hydrostatic drive with regeneration circuit of claim 1 further comprising a relief valve set at relatively low pressure operating in conjunction with said charge pump.

3. The closed loop hydrostatic drive with regeneration circuit of claim 1, further comprising an oil cooler through which flow from the rotary flow divider at low pressure is routed.

4. The closed loop hydrostatic drive with regeneration circuit of claim 1 further comprising a filter through which the flow from the rotary flow divider at low pressure is routed.

5. The closed loop hydrostatic drive with regeneration circuit of claim 1 further comprising an accumulator, said accumulator serving as a source of oil to said variable displacement pump.

6. The closed loop hydrostatic drive with regeneration circuit of claim 1 further comprising an anti-cavitation valve, said anti-cavitation valve serving as a source of oil to said variable displacement pump.

7. The closed loop hydrostatic drive with regeneration circuit of claim 1 wherein the first pump is a bi-directional pump and said circuit further comprises a one way-check valve located between said rotary flow divider and a section of the closed loop hydrostatic drive.

8. The closed loop hydrostatic drive with regeneration circuit of claim 1 wherein the first pump is a variable displacement pump.

9. The closed loop hydrostatic drive with regeneration circuit of claim 1 wherein the first pump is an axial piston pump.

10. The closed loop hydrostatic drive with regeneration circuit of claim 1 wherein the first pump is a variable displacement axial piston pump.

11. The closed loop hydrostatic drive with regeneration circuit of claim 1 wherein said valve means is a solenoid operated, two position three way valve.

* * * * *